(12) United States Patent
Giefer et al.

(10) Patent No.: US 8,250,943 B2
(45) Date of Patent: Aug. 28, 2012

(54) ACTUATING DEVICE FOR MOTOR VEHICLE TRANSMISSIONS

(75) Inventors: Andreas Giefer, Lemförde (DE); Ludger Rake, Diepholz (DE); Jörg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 685 days.

(21) Appl. No.: 12/438,622

(22) PCT Filed: Aug. 7, 2007

(86) PCT No.: PCT/DE2007/001398
§ 371 (c)(1),
(2), (4) Date: Feb. 24, 2009

(87) PCT Pub. No.: WO2008/022618
PCT Pub. Date: Feb. 28, 2008

(65) Prior Publication Data
US 2009/0266193 A1 Oct. 29, 2009

(30) Foreign Application Priority Data
Aug. 25, 2006 (DE) .......... 10 2006 039 860

(51) Int. Cl.
*F16H 59/04* (2006.01)
(52) U.S. Cl. .................. 74/473.33
(58) Field of Classification Search ......... 74/473.1, 74/473.3, 473.33, 471 XY
See application file for complete search history.

(56) References Cited

U.S. PATENT DOCUMENTS

| | | | | |
|---|---|---|---|---|
| 5,022,281 A | * | 6/1991 | Heizmann | 74/473.1 |
| 6,718,842 B1 | * | 4/2004 | Bofias | 74/473.33 |
| 2005/0239596 A1 | * | 10/2005 | Giefer et al. | 477/96 |

FOREIGN PATENT DOCUMENTS

| DE | 40 02 932 A1 | 8/1991 |
|---|---|---|
| DE | 101 46 783 A1 | 4/2003 |
| EP | 0 525 689 A1 | 2/1993 |
| EP | 1 213 509 A2 | 6/2002 |
| EP | 1 482 214 A2 | 12/2004 |
| WO | WO 2005/005867 | 1/2005 |

* cited by examiner

*Primary Examiner* — Richard W Ridley
*Assistant Examiner* — Phillip A Johnson
(74) *Attorney, Agent, or Firm* — McGlew and Tuttle, P.C.

(57) ABSTRACT

An actuating device for motor vehicle transmissions, especially for automatic transmissions has a selector lever (1), a transmission structure for sensing and transmitting the shift commands from the actuating device to the motor vehicle transmission, as well as a hinge structure with a four-bar mechanism (2) in which the selector lever (1) is mounted in such a way that it can perform shifting motions. The actuating device presents a small space requirements for installation with good ergonomic properties, good force-displacement curve at the selector lever qualities, as good sensing and signal transmission aspects. Visual shift gates and gear shifting gates can also be embodied at actuating devices of very compact design.

20 Claims, 1 Drawing Sheet

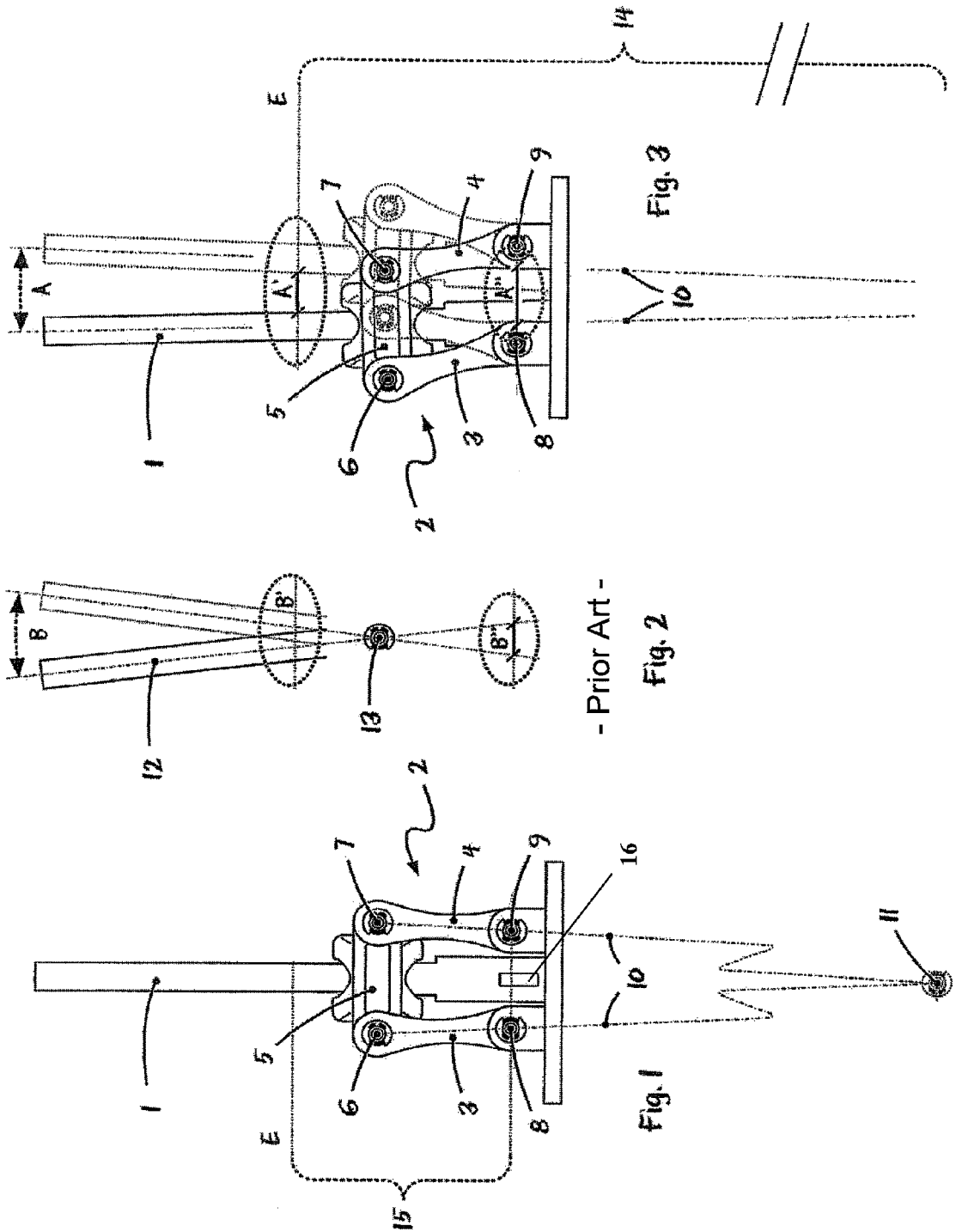

ACTUATING DEVICE FOR MOTOR VEHICLE TRANSMISSIONS

CROSS REFERENCE TO RELATED APPLICATIONS

This application is a U.S. National Phase application of International Application PCT/DE2007/001398 and claims the benefit of priority under 35 U.S.C. §119 of German Patent Application DE 10 2006 039 860.2 filed Aug. 25, 2006, the entire contents of which are incorporated herein by reference.

FIELD OF THE INVENTION

The present invention pertains to an actuating device for a motor vehicle transmission, especially for an automatic transmission, the actuating device including a selector lever shift, a transmission of the shift commands from the actuating device to the motor vehicle as well as a hinge structure for mounting the selector lever.

BACKGROUND OF THE INVENTION

Speed-change gears of motor vehicles are usually controlled and shifted by means of an actuating device arranged within reach of the driver. Actuating elements such as gearshift levers or selector levers, which are arranged, for example, between the front seats of the motor vehicle, are frequently used for this.

The design and ergonomic requirements imposed on such gearshift levers or selector levers are many and diverse. For example, to mediate a realistic feel of actuating the transmission to the driver, it is required for actuating devices of this class that these oppose the actuation with a certain resistance to motion, but continuous and smooth motion of the actuating element is nevertheless desired. At the same time, clear haptic and tactile feedback shall also be mediated to the driver, from which the river can intuitively infer the shifting operation performed during actuation.

Furthermore, it is also desirable to provide the driver with a clear optical feedback on the instantaneous state of the transmission or on the gear selected on the basis of the particular instantaneous position or angular position of the actuating elements, for example, of a selector lever. Against this background, a gear shifting gate, in the gates of which the gearshift or selector lever can move, is frequently arranged in the area of the gearshift or selector lever, and the gear shifting gate is usually provided with symbols or numbers in the sense of an unambiguous indication of the gear.

However, attention is also increasingly paid in the design of modern motor vehicles to the fact that actuating elements shall make do with a minimum of available installation space. Space is thus created for other components, on the one hand, and, on the other hand, the space available for the driver or passengers for moving can also be increased in this manner, without an increase in the dimensions of the vehicle being associated herewith. Another factor concerning the increasing size reduction especially of the actuating elements for vehicle transmissions is that modern gearboxes, but especially the current generations of automatic transmissions or automated motor vehicle transmissions, require only weak actuating forces, or are even controlled completely by means of actuators.

These, controlled by actuator devices, include especially the so-called "shift-by-wire" transmissions, in which there is usually no mechanical connection between the actuating element in the passenger compartment and the motor vehicle transmission itself any more. The shift commands are rather transmitted from the actuating device to the motor vehicle transmission mostly exclusively by means of electrical or electronic signals in the case of the example of the "shift-by-wire" transmissions. Thus, the need to transmit appreciable actuating forces or torques is thus eliminated from this side as well, and there is no longer a need to design bulky, long actuating elements or selector levers.

Concerning the design of actuating devices for motor vehicle transmissions, such developments consequently lead ultimately to the circumstance that actuating elements such as gear shift handle grips or selector levers are increasingly designed with smaller dimensions, reduced actuating forces as well as with shorter shifting paths.

Reductions in the space needed for installation and shortening of the shifting paths, in particular, often lead to the circumstance that a conspicuous gate contour or gearshift gate cannot be readily embodied any longer in the range in which a gear shift handle grip or selector lever is visible, because the motions of the gear shift handle grip or selector lever in the area of the gear shifting gate between two adjacent shift positions sometimes become smaller than the diameter of the lever arm due to the shorter shifting paths and the length of the lever, which is usually also reduced mainly because of considerations of the space available for installation.

Based on the fact that the relative motions are thus, on the whole, reduced in the area of the actuating elements for motor vehicle transmissions, reliable sensing of the instantaneous position of the selector lever becomes, moreover, increasingly difficult as well. Similar statements can also be made concerning haptics and ergonomics about the quality of the force-displacement curve of the locking of the selector lever, which cannot be readily ensured with the required quality as the dimensions and the angular motions of the selector lever become smaller.

SUMMARY OF THE INVENTION

Against this background, the object of the present invention is consequently to provide an actuating device for a motor vehicle transmission, with which the said drawbacks present in the state of the art are overcome. The present invention shall make it possible, in particular, to embody both a conspicuous gate contour or gear shifting gate and also embody reliable sensing of the selector lever position even in case of shorter shifting paths and/or in case of a reduction of the space available for installing the actuating device. Furthermore, a force-displacement curve of an unlimitedly high quality shall be able to be embodied in the sense of a reliable tactile feedback from the shifting operations despite reduced shifting paths and/or a reduction of the space available for installation.

According to the present invention a transmission actuating device is provided with a gear shift handle grip or selector lever and a transmission means for transmitting the shift commands from the actuating device to the motor vehicle transmission. The transmission means may be, for example, but by no means exclusively, a linkage, a cable or a sensor system with electrical or electronic signal transmission between the actuating device and the motor vehicle transmission. The actuating device comprises, furthermore, a hinge means for mounting the gear shift handle grip or selector lever within at least one plane of motion of the selector lever in such a way that it can perform shifting motions within at least one plane of motion of the selector lever. Further, according to the invention, the hinge means comprises at least one four-bar mechanism in which the selector lever is mounted movably.

Unlike in accordance with the state of the art, in which the gear shift handle grip or selector lever is usually connected to the vehicle structure by means of a ball and socket joint or a universal joint, the connection between the selector lever and the vehicle structure is thus brought about according to the present invention via the control arms of at least one four-bar mechanism.

This is advantageous first because with the use of a four-bar joint, the location of the fulcrum point or pivot axes of the selector lever does not have to be arranged within the actuating device itself any more, as in the state of the art. Arranging the location of the fulcrum point or pivot axes within the actuating device itself leads to the limitations described in the introduction concerning the resulting kinematics of the selector lever. The use of the four-bar mechanisms instead further makes it possible to replace the real fulcrum point or the real pivot axes of the selector lever with a virtual fulcrum point or with a virtual pivot axis.

The virtual fulcrum point or the virtual pivot axes can be arranged very extensively freely in space. For example, it is quite possible to arrange the virtual fulcrum point (which is, however, perceived as real by the operator) not only outside the actuating device itself, but even to position it, if needed, for example, under the floor of the vehicle. However, despite such a virtual length of the selector lever, which can be selected almost as desired, the actuating device can continue to be designed as a small and compact actuating device without changes.

Thanks to the fact that the fulcrum points or pivot axes of the actuating elements can thus be positioned according to the present invention nearly as desired, both the transmitting means and the locking of the actuating element, and, furthermore, shift gates or gear shifting gates at the actuating element can be arranged with a greater freedom in design or can be embodied in the first place in case of greatly reduced space available for an actuating device, as well as in case of shorter shifting paths.

Furthermore, the ergonomics of the actuating element, which is perceived by the operator, is also improved based on the kinematics of the actuating element. This kinematics is made possible by means of the four-bar mechanism and thanks to the virtual fulcrum points that can thus be embodied, and which can have, for example, a larger translation component with a reduced rotation component at the same time during the motion of the selector lever. In other words, this means that the operator has the impression of having a long lever with corresponding force-displacement curves at hand, even though the actuating element, which is actually much shorter, is in reality mounted in an extremely compact housing by means of a four-bar mechanism, but the virtual fulcrum point can be located quite far outside the housing of the actuating device.

The present invention can primarily be embodied independently from the particular design, dimensioning and arrangement of the four-bar mechanism as long as the four-bar mechanism permits the desired kinematics of the actuating element to be embodied. However, the distance between the selector lever-side hinge points of the four-bar mechanism is greater than the distance between the body-side hinge points in a preferred embodiment of the present invention.

This advantageously leads to a selector lever kinematics in which the virtual fulcrum point or the virtual pivot axis of the selector lever is arranged on the body side and away from the selector lever. The shifting behavior provides a feel, with an actuating device of such a design according to the invention, to correspond essentially to the shifting behavior of traditional actuating elements or selector levers, in which the real fulcrum point is arranged comparatively low in the area of the floor of the vehicle.

According to another embodiment of the present invention, the four-bar mechanism is set up such that the selector lever is mounted in such a way that it can perform shifting motions in two planes of motion located at right angles to one another. In other words, this means that the selector lever can thus be pivoted by means of the four-bar mechanism not only within one plane of motion. Rather, the actuating element or the selector lever according to this embodiment of the present invention can be moved by means of the four-bar mechanism, for example, along the direction of travel and it can additionally also perform shifting operations at right angles to the direction of travel. For example, both gear shifting (motion of the lever in/against the direction of travel) and shifting from one gate to another (motion of the lever at right angles to the direction of travel) can thus be performed in the automatic transmission.

First, it makes no difference in terms of design how the actuating element is mounted in the two planes of motion located at right angles to one another in such a way that it can perform shifting motions. It is conceivable, for example, to arrange at least two four-bar mechanisms in a cage-like manner for this purpose and to arrange two adjacent lever fulcrum points of the four-bar mechanisms each on a common pivot axis, which is positioned at right angles to the axis of rotation of the fulcrum points of the lever. The two four-bar mechanisms arranged in a cage-like pattern thus make possible motions of the actuating element both along the direction of travel and at right angles to the direction of travel.

However, the hinge points of the four-bar mechanism are designed as ball and socket joints according to a preferred embodiment of the present invention. This leads to an especially simple design embodiment of the mounting of the selector lever in the two planes of motion that are at right angles to one another in such a way that shifting motions can be performed, especially in case of the cage-like combination of two four-bar mechanisms.

According to other, preferred embodiments of the present invention, the selector lever-side working point of the transmission means or sensing for transmitting the shift commands and the locking means for generating a defined force-displacement curve at the actuating element are arranged each in the area of the body-side hinge points of the four-bar mechanism.

The arrangement of the working points of the transmission means and the arrangement of the locking means of the actuating element in the vicinity of the body-side hinge points of the four-bar mechanism leads to an especially compact design of the actuating device, because the space available in the area of the body-side end of the actuating element can also be used and precisely this space can be used for design purposes.

This is not obvious in the state of the art at all, especially because the shifting paths that can be sensed at the selector lever in the actuating devices known from the state of the art decrease with decreasing distance between the point of sensing and the body-side end of the selector lever. Thus, the closer the point of sensing or locking in the area of the body-side end of the selector lever, the more difficult it is consequently in the state of the art to obtain a reliable point of sensing for the transmission means of the shift commands or for embodying a force-displacement curve of high quality.

However, since the kinematics of motion of the selector lever can be designed predominantly as a translatory and to a lesser extent as a rotatory kinematics thanks the present invention and thanks to the virtual fulcrum point thus made possible, a much greater freedom of design is also made possible by the present invention in arranging the sensing point of the transmission means or in arranging the locking of the selector lever.

The sensing point for the transmission means or the locking means of the actuating element can thus also be arranged, thanks to the present invention, in an especially compact manner and precisely in the area of the body-side fulcrum point of the four-bar mechanism. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of an embodiment of an actuating device according to the present invention;

FIG. 2 is an actuating device according to the state of the art in a representation and view a relative automotive position coordinated to FIG. 1; and FIG. 3 is the actuating device according to FIG. 1 during actuation in a representation and view a relative automotive position coordinated to FIGS. 1 and 2.

DESCRIPTION OF THE PREFERRED EMBODIMENTS

Referring to the drawings in particular, FIG. 1 shows a schematic side view of an embodiment for an actuating device according to the present invention. A selector lever 1 shown without actuating knob as well as a four-bar mechanism 2, in which the selector lever 1 is mounted and comprises the two pivoted levers 3, 4 as well as the four-bar connection member 5 arranged between the pivoted levers 3, 4, are recognized first. The connection member 5 is in turn connected to the selector lever 1 and thus guides the selector lever 1 kinematically in agreement with the pivoting motions of the connection member 5 of the four-bar mechanism 2.

The selector lever-side hinge points 6, 7 of the four-bar mechanism 2, i.e., the hinge points that are at the top in relation to the drawing, have a greater distance from one another than the body-side hinge points 8, 9 of the four-bar mechanism 2, i.e., the hinge points that are the lower hinge points relative to the drawing, in the embodiment of the actuating device shown. The kinematics or position of the virtual fulcrum point 11 of the connection member 5 in the four-bar mechanism 2 and hence also of the selector lever 1 that is shown by dash-dotted line 10 in FIG. 1 in the form of a suggestion is obtained due to this arrangement of the hinge points 6, 7, 8, 9 of the four-bar mechanism 2.

In other words, this means that in the position shown of the four-bar mechanism 2 and of the selector lever 1, the virtual fulcrum point 11 of the connection member 5 in the four-bar mechanism 2 is in the point of intersection of the connection lines 10 passing through the hinge points of the two pivoted levers 3, 4 of the four-bar mechanism 2. In the embodiment of the actuating device shown, the fulcrum point 11 is down relative to the drawing to such an extent that the actual location of the virtual fulcrum point 11 cannot be shown on the drawing sheet any more and the dash-dotted connection lines 10 passing through the hinge points 6, 7, 8, 9 of the two pivoted levers 3, 4 of the four-bar mechanism 2 are therefore also shown in a correspondingly kinked form.

A lever motion as is shown in FIG. 3 is obtained during the actuation of the selector lever 1 of the actuating device according to the present invention because of the special kinematics of the four-bar mechanism 2. In other words, this means first that the selector lever 1 of the actuating device according to the present invention shown behaves for the operator as if the selector lever 1 were comparatively long and as if the fulcrum point 11 of the selector lever were located far below the actuating device or even outside the drawing sheet, as this is also indicated in the form of a suggestion on the basis of the dash-dotted extensions 10 of the longitudinal axes of the lever in the two actuation positions in FIG. 3.

The felt kinematics of the selector lever 1 of the actuating device shown in FIGS. 1 and 3 agrees to a conventional, but much longer selector lever. However, this would require a much larger space for installation than in the case of the actuating device according to FIG. 1, which can be designed as an extremely compact actuating device according to the present invention.

Whether the plane of motion of the selector lever 1 at the motor vehicle, which coincides here with the plane of the drawing sheet, extends in the longitudinal direction of the vehicle or in the transverse direction of the vehicle is irrelevant at first in the embodiment being shown. The lever motion extending at right angles to the plane of motion being shown (here consequently the lever motion into the drawing plane and out of the drawing plane) can then take place in both cases by means of a conventional joint mount, which may be arranged, for example, in the connection member 5 of the four-bar mechanism 2. However, the four-bar mechanism 2 may also be designed such that both lever motions within the drawing plane, as shown, and lever motions at right angles to the drawing plane can be performed by corresponding motions of the four-bar mechanism 2. The advantages according to the present invention thus become manifest in this case during lever motions in the longitudinal direction of the vehicle and the transverse direction of the vehicle alike.

If one wanted to accommodate a conventional selector lever 12 according to the state of the art in a space just as compact as that required by the actuating device according to the present invention, a picture as shown in FIG. 2 would be obtained as an example. Even though the same actuation paths B=A would be able to be obtained in the area of the lever end or at the shift knob (not shown) at B with the conventional selector lever 12 according to FIG. 2 as with the actuating device according to the present invention at A according to FIG. 3, the desired kinematics of a long lever would not be present any more in the selector lever 12 according to FIG. 2, which is mounted in the conventional manner because of the fulcrum point 13 being located much farther above and the resulting strong rotation component of the lever motion.

On the other hand, a selector lever 12 of a conventional design, which should have, on the whole, a kinematics comparable to that of the actuating device according to the present invention, would require an installation space several times larger than that of the actuating device according to the present invention, because the fulcrum point 13 of such a conventional selector lever 12 would have to be arranged much farther down. Reference is made for this in the view in the figure to the great distance 14 between plane E of the gear shifting gate (not shown) and the virtual fulcrum point 11 of the lever in the actuating device according to the present invention, which distance is already shown as a shortened distance in the drawing, compared to the short and hence compact distance 15 between plane E and the actual lower fulcrum points 8, 9 of the four-bar mechanism 2.

However, the selector lever 12 mounted in the conventional manner according to FIG. 2 would, in particular, also hardly be able to be provided with a visually conspicuous gear shifting gate at the level of plane E of the gearshift cover, let alone to be equipped with a gear shifting gate, likewise at the level of plane E. This is due above all to the fact that the lever paths that the conventional selector lever 12 travels during shifting motions in the area B' marked in FIG. 2 is already much too small to also permit the webs of a gear shifting gate to be arranged there, for example, between different shifting planes of the selector lever 12, or to make it also possible to arrange even a clear visualization or lettering of the different selector lever positions.

For illustration, reference is made here to a viewing together of FIGS. 2 and 3, and there especially to a comparison of the distances of the lever surfaces between adjacent selector lever positions or shifting planes, which said distances are designated by A' and B', respectively. It is recognized that distance A' will be much greater in the selector lever designed according to the present invention according to FIG. 3 than the corresponding distance B' in a selector lever 12 mounted in the conventional manner according to FIG. 2, which latter distance even becomes smaller than zero in the example shown.

Unproblematic arrangement of the webs of a gear shifting lever or clear visualization and lettering of the selector lever positions and gear shifting gates is thus readily possible in a selector lever 1 designed according to the present invention according to the view in FIG. 3, because, thanks to the special kinematics of motion of the selector lever, which is made possible with the four-bar mechanism 2, a sufficient distance still remains at the level of plane E of a gearshift cover or gear shifting lever between the individual selector lever positions in order to make it possible to arrange the web of a gear shifting lever, for example, in the intermediate space A' between two shifting planes of the selector lever.

Finally, the selector lever 12 mounted in the conventional manner according to FIG. 2 would also entail problems in the arrangement of both the transmission means and the reliable sensing of the selector lever position and in connection with the embodiment of the locking of the selector lever 12 with the desired force-displacement curve. The elements of the transmission means (for example, Bowden cable, linkage or the like) and the elements of the means sensing the selector lever position (for example, Hall sensors, microswitches or the like) as well as the locking means 16 are usually arranged in a selector lever 12 mounted in the conventional manner on the side of the selector lever mount located opposite the selector lever, i.e., approximately in the area designated by letter B" in FIG. 2. The paths B" available for the sensing and locking thus also become increasingly smaller with progression of the size reduction of the installation space and with shortening of the paths of the selector lever, and the necessary forces become at the same time increasingly stronger as the corresponding components are moved increasingly closer to the axis of rotation 13 of lever 12.

However, these problems also do not occur in a selector lever 1 designed according to the present invention according to FIGS. 1 and 3, cf. section A" available for actuating the transmission means (not shown) and for locking the selector lever positions in a selector lever 1 according to the present invention according to FIG. 3 compared to the corresponding, but considerably shorter section B" in a selector lever 12 of a conventional design.

At the same time, an actuating device designed according to the present invention according to FIGS. 1 and 3 with a selector lever 1 does, however, remain, on the whole, extremely compact, and valuable installation space can thus be saved in the interior space of the vehicle, and such space can be made available, instead, to the passengers or used in terms of design for other purposes.

Thus, it becomes clear as a result that the present invention leads to an actuating device for motor vehicle transmissions, which has considerable advantages over the state of the art concerning the management of the conflicting objectives between short shifting path and the need for a small installation space, on the one hand, as well as between the embodiment of a qualitatively and ergonomically high-quality force-displacement curve and reliable sensing or signal transmission, on the other hand. Furthermore, a conspicuous gear shifting gate contour or gear shifting gate can possibly be readily embodied thanks to the present invention even in an extremely compact actuating device of a space-saving design.

Thus, the present invention makes a substantial contribution to the improvements of the ergonomics of the shifting actuation along with a reduction of the size of the space needed for the installation in the area of the actuating devices for motor vehicle transmissions, especially in case of use for demanding applications in the area of automatic transmissions and automated gearboxes.

While specific embodiments of the invention have been shown and described in detail to illustrate the application of the principles of the invention, it will be understood that the invention may be embodied otherwise without departing from such principles.

LIST OF REFERENCE NUMBERS

1 Selector lever
2 Four-bar mechanism
3 Pivoted lever
4 Pivoted lever
5 Connection member
6, 7 Selector lever-side hinge point
8, 9 Body-side hinge point
10 Body-side hinge point
11 Virtual fulcrum point
12 Selector lever (state of the art)
13 Real fulcrum point
14, 15 Distances
E Plane of gear shifting gate

The invention claimed is :

1. An actuating device for motor vehicle automatic transmissions, the actuating device comprising:
   a selector lever;
   a transmitting means for transmitting shift commands from the actuating device to a motor vehicle transmission;
   hinge mounting means for mounting said selector lever, said selector lever performing shifting motions in at least one plane of motion, said hinge mounting means comprising at least one four-bar mechanism in which said selector lever is mounted movably, said four-bar mechanism comprising a top four-bar connection member, said top four-bar connection member being movably connected to said selector lever such that said top four-bar connection member moves with said selector lever.

2. The actuating device in accordance with claim 1, wherein:
   said four-bar mechanism comprising bars, each of said pivotable bars being hinged at one of four selector lever-side hinge points and at one of four body-side hinge points, said four-bar connection member defining at a least a portion of each of said selector lever-side hinge points; and a distance between said selector lever-side hinge points of said four-bar mechanism is greater than a distance between said body-side hinge points of said four-bar mechanism.

3. The actuating device in accordance with claim 2, wherein each of said four selector lever-side hinge points and said four body-side hinge points of said four-bar mechanism comprise a ball and socket joint.

4. The actuating device in accordance with claim 3, wherein a selector lever-side working point of the transmitting means is arranged in an area of said body-side hinge points of said four-bar mechanism.

5. The actuating device in accordance with claim 3, further comprising:
a locking element for generating a defined force-displacement curve at said selector lever, said locking element being arranged in an area of said body-side hinge points of said four-bar mechanism.

6. The actuating device in accordance with claim 3, wherein each of said four bars is pivotably connected to said top four-bar connection member via said ball and socket joint and each of said four bars is pivotably connected to a fixed base plate via another said ball and socket joint.

7. The actuating device in accordance with claim 6, wherein each of said pivotable bars has a length that is equal to a length of another one of said pivotable bars.

8. The actuating device in accordance with claim 6, wherein said top four-bar connection member is located at a position above said fixed base plate, said top four-bar connection member being substantially perpendicular to said selector lever.

9. The actuating device in accordance with claim 3, wherein the four-bar mechanism mounts said selector lever for performing shifting motions in another plane of motion, said another plane of motion extending at a right angle to said at least one plane of motion.

10. A vehicle transmission actuating device comprising:
a selector lever;
a four-bar mechanism comprising a top selector lever connection member connected to said selector lever and four bars, each of said bars being connected to a vehicle at body-side hinge points and being connected to said top selector lever connection member at selector lever-side hinge points for moving said selector lever in shifting motions in at least one plane of motion, wherein said top selector lever connection member is movable with said selector lever in said at least one plane of motion; and
a transmitting means for sensing and transmitting shift commands, based on movement of said shift lever, from the actuating device to a motor vehicle transmission of the vehicle.

11. The actuating device in accordance with claim 10, wherein:
a distance between said selector lever-side hinge points of said four-bar mechanism is greater than a distance between said body-side hinge points of said four-bar mechanism.

12. The actuating device in accordance with claim 11, wherein each of said body-side hinge points and said selector lever-side hinge points of said four-bar mechanism comprise a ball and socket joint.

13. The actuating device in accordance with claim 12, said transmitting means has a selector lever-side working point adjacent to said body-side hinge points.

14. The actuating device in accordance with claim 12, further comprising:
a locking element for generating a defined force-displacement curve at said selector lever, said locking element being positioned adjacent to said body-side hinge points.

15. The actuating device in accordance with claim 12, wherein each of said four bars is pivotably connected to said top selector lever connection member via said ball and socket joint and each of said four bars is pivotably connected to a fixed base plate via another said ball and socket joint, said fixed base plate defining at a least a portion of said body-side hinge points.

16. The actuating device in accordance with claim 15, wherein each of said four bars has a bar length, said bar length of each of said four bars being equal to said bar length of another one of said four bars.

17. The actuating device in accordance with claim 16, wherein said top selector lever connection member is located at a position above said fixed base plate, said top selector lever connection member being substantially perpendicular to said selector lever.

18. The actuating device in accordance with claim 12, wherein said four-bar mechanism supports said selector lever for shifting motions in another plane of motion, said another plane of motion extending at right angle to said at least one plane of motion.

19. A vehicle transmission actuating device comprising:
a selector lever;
a fixed base element;
a plurality of bottom ball and socket joints;
a plurality of top ball and socket joints;
a selector lever connection member;
a first bar;
a second bar;
a third bar; and
a fourth bar, said first bar and said second bar being arranged on one side of said selector lever, said third bar and said fourth bar being arranged on another side of said selector lever, said first bar being opposite said third bar, said second bar being opposite said fourth bar, said fixed base plate comprising vehicle body-side hinge points, said selector lever connection member being located at a position above said fixed base plate, said selector lever connection member comprising selector lever-side hinge points, one end of each of said first bar, said second bar, said third bar and said fourth bar being pivotably connected to said vehicle body-side hinge points via one of said plurality of bottom ball and socket joints, another end of each of said first bar, said second bar, said third bar and said fourth bar being pivotably connected to said selector lever-side hinge points via one of said plurality of top ball and socket joints, wherein said selector lever connection member is movably connected to said selector lever such that said four-bar connection member moves with said selector lever in at least one plane of motion; and
a transmitting means for sensing and transmitting shift commands, based on movement of said shift lever, from the actuating device to a motor vehicle transmission of the vehicle.

20. The actuating device in accordance with claim 19, wherein a distance between said selector lever-side hinge points is greater than a distance between said body-side hinge points of said four-bar mechanism.

* * * * *